US012589869B2

(12) United States Patent
Moebius et al.

(10) Patent No.: US 12,589,869 B2
(45) Date of Patent: Mar. 31, 2026

(54) AIRCRAFT

(71) Applicant: Archer Aviation Inc., San Jose, CA (US)

(72) Inventors: Andreas Moebius, Wessling (DE); Matt Wildoer, Wessling (DE); Kilian Brath, Wessling (DE); Javier Sainz De La Maza, Wessling (DE)

(73) Assignee: Archer Aviation Inc., San Jose, CA (US)

( * ) Notice: Subject to any disclaimer, the term of this patent is extended or adjusted under 35 U.S.C. 154(b) by 386 days.

(21) Appl. No.: 17/675,661

(22) Filed: Feb. 18, 2022

(65) Prior Publication Data

US 2022/0266998 A1 Aug. 25, 2022

Related U.S. Application Data

(63) Continuation of application No. PCT/EP2022/052160, filed on Jan. 31, 2022.

(30) Foreign Application Priority Data

Feb. 19, 2021 (EP) .................................... 21158191

(51) Int. Cl.
| | |
|---|---|
| *B64C 29/02* | (2006.01) |
| *B64C 1/00* | (2006.01) |
| *B64C 29/00* | (2006.01) |
| *B64U 30/26* | (2023.01) |

(Continued)

(52) U.S. Cl.
CPC ........ *B64C 29/0033* (2013.01); *B64C 1/0009* (2013.01); *B64C 29/02* (2013.01); *B64U 30/26* (2023.01); *B64U 50/18* (2023.01); *B64U 10/25* (2023.01)

(58) Field of Classification Search
CPC .... B64C 9/02; B64C 9/16; B64C 9/18; B64C 29/0008; B64C 29/0016; B64C 29/0033; B64C 15/12
See application file for complete search history.

(56) References Cited

U.S. PATENT DOCUMENTS

| | | | |
|---|---|---|---|
| 2,284,519 | A | 5/1942 | Hall |
| 2,371,976 | A | 3/1945 | Patch |

(Continued)

FOREIGN PATENT DOCUMENTS

| | | | | |
|---|---|---|---|---|
| CA | 3033754 A1 | * | 9/2019 | ............. B64C 13/30 |
| DE | 7822923 U1 | | 3/1983 | |

(Continued)

OTHER PUBLICATIONS

Extended European Search Report for EP Application No. 21158191.3, mailed Aug. 12, 2021.

*Primary Examiner* — Kimberly S Berona
(74) *Attorney, Agent, or Firm* — Finnegan, Hederson, Farabow, Garrett & Dunner LLP

(57) ABSTRACT

An aircraft, particularly an aircraft for vertical take-off and landing. The aircraft includes a fuselage, and a variable lift body defining an aerofoil. The variable lift body is moveably attached to the fuselage. The variable lift body is pivotable around a first axis extending in the wing span direction. The rotary actuator is adapted to cause the variable lift body to pivot in relation to the fuselage arranged within the aerofoil.

13 Claims, 4 Drawing Sheets

(51) Int. Cl.
    *B64U 50/18*         (2023.01)
    *B64U 10/25*         (2023.01)

(56)       References Cited

U.S. PATENT DOCUMENTS

| | | | |
|---|---|---|---|
| 2,779,555 A * | 1/1957 | Danielson | B64C 9/16 |
| | | | 244/216 |
| 3,179,354 A | 4/1965 | Alvarez-Calderon | |
| 4,213,587 A * | 7/1980 | Roeseler | B64D 45/0005 |
| | | | 114/274 |
| 4,717,097 A | 1/1988 | Sepstrup | |
| 4,773,620 A | 9/1988 | Seidel | |
| 4,995,575 A * | 2/1991 | Stephenson | B64C 9/16 |
| | | | 244/216 |
| 5,836,550 A | 11/1998 | Paez | |
| 9,376,203 B2 | 6/2016 | Tieys et al. | |
| 9,783,292 B2 | 10/2017 | Kooiman et al. | |
| 10,703,463 B2 * | 7/2020 | Mercier | B64C 13/38 |
| 11,260,958 B2 * | 3/2022 | Tsai | B64C 13/32 |
| 2002/0047068 A1 * | 4/2002 | Uchida | B64C 13/30 |
| | | | 244/99.3 |
| 2008/0040886 A1 * | 2/2008 | Arnold | F16C 33/102 |
| | | | 384/322 |
| 2009/0256026 A1 | 10/2009 | Karem et al. | |
| 2012/0061524 A1 | 3/2012 | Schlipf et al. | |
| 2012/0091283 A1 * | 4/2012 | Uchida | B64C 9/02 |
| | | | 244/99.3 |
| 2014/0001309 A1 * | 1/2014 | Tieys | B64C 3/50 |
| | | | 244/99.3 |
| 2015/0336658 A1 * | 11/2015 | Habibvand | B64C 9/22 |
| | | | 244/213 |
| 2016/0311522 A1 * | 10/2016 | Wiegand | B64U 50/18 |
| 2017/0203839 A1 * | 7/2017 | Giannini | B64U 10/20 |
| 2017/0233107 A1 * | 8/2017 | Keskin | B64F 5/60 |
| | | | 244/99.2 |
| 2018/0002016 A1 | 1/2018 | Mccullough et al. | |
| 2019/0359314 A1 * | 11/2019 | Tsai | B64C 9/18 |
| 2020/0079498 A1 * | 3/2020 | Mercier | B64C 13/34 |
| 2020/0115033 A1 * | 4/2020 | Tsai | B64C 9/20 |
| 2020/0130809 A1 * | 4/2020 | Tsai | B64C 5/10 |
| 2020/0130812 A1 * | 4/2020 | Tsai | B64C 9/18 |
| 2020/0377194 A1 * | 12/2020 | Tsai | B64C 9/02 |
| 2020/0391845 A1 * | 12/2020 | Tsai | B64C 9/18 |
| 2021/0009255 A1 * | 1/2021 | Gruner | B64C 9/00 |
| 2021/0061441 A1 * | 3/2021 | Gruner | B64C 9/18 |
| 2021/0061443 A1 * | 3/2021 | Dahl | B64C 9/04 |
| 2021/0371131 A1 * | 12/2021 | Gaston | F16C 43/02 |
| 2021/0387716 A1 * | 12/2021 | Tsai | B64C 9/02 |
| 2021/0403144 A1 * | 12/2021 | Tsai | B64C 9/16 |

FOREIGN PATENT DOCUMENTS

| | | | | |
|---|---|---|---|---|
| DE | 102015207445 A1 | 10/2016 | | |
| EP | 3425777 A2 | 1/2019 | | |
| EP | 3425777 A3 | 1/2019 | | |
| EP | 3584155 A1 * | 12/2019 | | B64C 13/28 |
| ES | 2173770 A1 | 10/2002 | | |
| GB | 2578115 A * | 4/2020 | | B64C 1/26 |
| WO | WO-2019076341 A1 * | 4/2019 | | B64C 13/50 |

* cited by examiner

AIRCRAFT

CROSS-REFERENCE TO RELATED APPLICATIONS

This application claims priority from and benefit of European Patent Application No. EP21158191.3, entitled "Aircraft," and filed on Feb. 19, 2021, and PCT International Patent Application No. PCT/EP2022/052160, entitled "Aircraft" and filed on Jan. 31, 2022, each of which is hereby incorporated by reference herein in its entirety.

FIELD OF THE INVENTION

The present invention relates generally to aircrafts, and more specifically, to an aircraft capable of vertical take-off and landing (VTOL).

BACKGROUND OF THE INVENTION

Aircraft capable of vertical take-off and landing (VTOL) have the potential to incorporate both the advantages of helicopters, namely starting and landing using limited space and/or in rough terrain, as well as the advantages of conventional aircraft, such as high traveling velocities and cruising efficiently, with one another. Challenges in the design of VTOL aircraft include the necessity that, on the one hand, large propeller areas are required for the provision of a sufficient mass flow to create thrust into the vertical direction for takeoff or landing, and at the same time, limit the energy consumption. On the other hand, propellers must be configured for the least amount of aerodynamic resistance for cruising, when the lift is dynamically created by means of suitable wing profiles. Accordingly, it is desirable to have a VTOL aircraft with reduced energy consumption without compromising on performance.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, an aircraft, particularly an aircraft capable of vertical take-off and landing, is disclosed. The aircraft includes a fuselage, a variable lift body, and a rotary actuator. The variable lift body defines an aerofoil and is moveably attached to the fuselage. The variable lift body is pivotable around a first axis extending in a direction of a wingspan of the aircraft. The rotary actuator is adapted to cause the variable lift body to pivot in relation to the fuselage arranged within the aerofoil.

According to certain aspects of the present disclosure, the variable lift body is fastened to the fuselage with at least one joint assembly adapted for transferring torque around the first axis from the variable lift body to the fuselage. In such aspects, the rotary actuator is arranged adjacent to the at least one joint assembly in the direction of the first axis.

According to certain aspects of the present disclosure, the rotary actuator has an axis of rotation parallel to the first axis.

According to certain aspects of the present disclosure, an aircraft, particularly an aircraft capable of vertical take-off and landing, is disclosed. The aircraft includes a fuselage, a variable lift body, and at least one joint assembly for fastening the variable lift body to the fuselage. The variable lift body is moveably attached to the fuselage. The variable lift body is pivotable around a first axis extending in a direction of a wingspan of the aircraft. The at least one joint assembly is adapted for transferring torque around the first axis from the variable lift body to the fuselage. The at least one joint assembly is adapted to allow freedom of rotational movement around a second axis crosswise, in particular perpendicular, to the first axis.

According to certain aspects of the present disclosure, the at least one joint assembly is adapted to allow freedom of rotational movement around a third axis crosswise, in particular perpendicular, to both the first axis and the second axis.

According to certain aspects of the present disclosure, the at least one joint assembly further includes at least one spherical joint, in particular exactly one spherical joint, for attaching the variable lift body to the fuselage.

According to certain aspects of the present disclosure, the at least one joint assembly further includes at least one linkage attaching the variable lift body to the fuselage. (ii) a second spherical joint connecting the variable lift body to the at least one linkage, and (iii) a third spherical joint connecting the fuselage to the at least one linkage.

According to certain aspects of the present disclosure, the at least one joint assembly includes a plurality of spherical joints arranged in a plane, particularly a plane crosswise, in particular perpendicular, to the first axis.

According to certain aspects of the present disclosure, the at least one joint assembly includes a double cardan joint connecting the variable lift body to the fuselage.

According to certain aspects of the present disclosure, the at least one joint assembly includes a crown spine connecting the variable lift body to the fuselage.

According to certain aspects of the present disclosure, the at least one joint assembly includes a jaw coupling connecting the variable lift body to the fuselage.

According to certain aspects of the present disclosure, the at least one joint assembly includes a solid body spring connecting the variable lift body to the fuselage.

According to certain aspects of the present disclosure, the variable lift body is fastened to fuselage using two or more joint assemblies distanced apart in the direction of the first axis.

According to certain aspects of the present disclosure, the variable lift body is fastened to the fuselage using exactly one joint assembly and at least one bearing distanced apart from the joint assembly in the direction of the first axis. In such aspects, the at least one bearing allows rotational freedom of movement around the first axis, the second axis, and/or the third axis.

According to certain aspects of the present disclosure, the variable lift body includes an engine adapted to provide thrust to the aircraft for at least one of take-off, landing, or cruising. The engine is pivotable in relation to the fuselage between a cruising flight position in which the thrust direction of the engine is aligned with a longitudinal axis of the aircraft, and a take-off/landing position in which the thrust direction of the engine is angled towards a vertical axis of the aircraft.

According to certain aspects of the present disclosure, the variable lift body further include an aerodynamic control structure, in particular (i) an aileron, or (ii) a control canard.

According to certain aspects of the present disclosure, the aircraft further includes at least one primary lift body, in particular a canard or a wing, stationarily attached to the fuselage. In such aspects, the variable lift body is attached to the at least one primary lift body. In some such aspects, the variable lift body is arranged behind the at least one primary lift body with regard to a direction of cruise flight.

According to certain aspects of the present disclosure, the aircraft further includes an attachment rotatably connecting the variable lift body to fuselage around the first axis. The attachment allows freedom of linear movement of the variable lift body in the direction of the first axis.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figures 1A, 1B, 2A, 2B, 3:
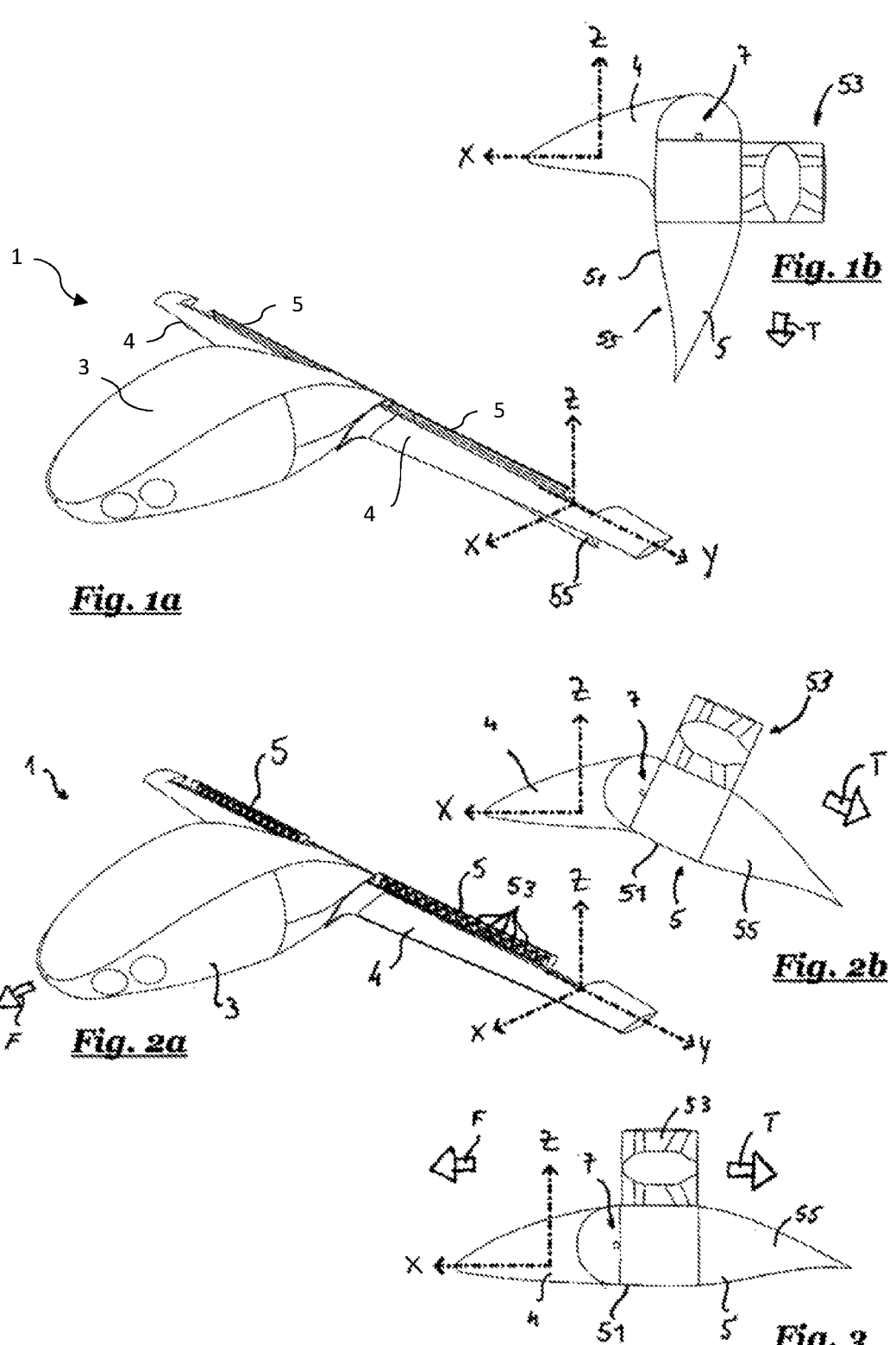
FIG. 1a shows a perspective view of an aircraft having a variable lift body arranged in a vertical take-off/landing position, according to certain aspects of the present disclosure.
FIG. 1b shows a schematic view of the variable lift body of FIG. 1a in the vertical take-off/landing position, according to certain aspects of the present disclosure.
FIG. 2a shows a perspective view of the aircraft of FIG. 1a wherein the variable lift body is arranged in an angled position, according to certain aspects of the present disclosure.
FIG. 2b shows a schematic view of the variable lift body of FIG. 1a in the angled position, according to certain aspects of the present disclosure.
FIG. 3 shows a schematic view of the variable lift body of FIG. 1a in a cruising position, according to certain aspects of the present disclosure.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near." "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Vertical take-off aircraft designed for hovering flight include engines that can be rotated about a pivot axis.

During take-off, landing, or hovering flight, the engines are placed in a take-off/landing position in which the direction of thrust is oriented vertically. In order to accelerate the aircraft after take-off the engines may be continuously pivoted in such a way that the direction of thrust is ultimately aligned with a cruise flight direction. The thrust provided by the engine to power the aircraft is transferred towards the fuselage through a mechanical system attaching the engine to the fuselage and allowing the engine to be pivoted in relation to the fuselage. The mechanical system has to be capable of reliably holding the engine in a desired, well-defined position with regard to the fuselage. In order to allow for energy-efficient cruising, hovering, take-off and/or landing, the mechanical system should be as lightweight as possible. Especially for energy-efficient cruising, the mechanical system should add as little drag as possible. Particularly for aircraft having primary lift bodies (e.g., wings) designed as larger and statically load-bearing elements fastened to the fuselage and the engine being attached to the fuselage via a primary lift body (e.g., wing), it is important that mechanical stresses for example due to bending of the primary lift bodies around the longitudinal and/or vertical axis of the aircraft, do not impair the workings of the engine.

For conventional aircraft, U.S. Pat. No. 4,773,620 A describes a device for actuating aircraft control surfaces having an actuator disposed within the control surface. The control surface described is an aileron pivotably attached to a wing structural box. The actuator is a longitudinally extendable hydraulic piston which is, on one hand, fastened to the wing structural box eccentrically with regard to the pivot axis of the control surface, and, on the other hand, rearwardly within the control surface. By changing the length of the hydraulic piston actuator, the pivoting position of the control surface in relation to the wing structural box can be controlled. The hydraulic piston actuator is a heavy and bulky. It is a further disadvantage of the described design that, in order to achieve large pivoting angles, such as required for control surfaces for example of VTOL aircraft, the mechanical system including the piston actuator would need to breach the aerofoil, thereby significantly increasing drag. A loss of pressure of the hydraulic actuator would cause the control surface to pivot uncontrollably.

It is an object of the invention to overcome the above disadvantages, in particular to provide mechanically reliable and energy saving means for attaching an engine or other variable lift body to the fuselage of an aircraft, particularly a VTOL, more particularly an eVTOL. This objective is solved by the subject matter of independent claims 1 and 4.

A first aspect of the invention relates to an aircraft, in particular an aircraft capable of vertical takeoff and landing, comprising a fuselage and a variable lift body. The variable lift body defines an aerofoil and is movably attached to the fuselage. The variable lift body is pivotable with regard to the fuselage around a first axis extending in the wing span direction. The variable lift body may for example be a control canard. The first axis may correspond to a lateral axis of the aircraft and/or a pitch axis of the aircraft. The aircraft may be provided with the primary lift body fastened to the fuselage, such that the variable lift body is pivotable also with regard to the primary lift body around the first axis. In particular, the first axis extends in the wing span direction of the variable lift body. The first axis may be defined by a wing span direction of the primary lift body. The primary lift body may be designed larger than the variable lift body and as a statically load-bearing element. The variable lift body may for instance be realized in the form of the landing flap or an aileron.

According to the first aspect of the invention, the aircraft further comprises a rotary actuator adapted to cause the variable lift body to pivot in relation to the fuselage. The rotary actuator is arranged within the aerofoil defined by the variable lift body. It may be preferred that the rotary actuator includes a rotary electromotor, such as a rotary servo motor or stepper motor. The rotary actuator may include a transmission for transforming relatively little torque provided at relatively large rpm by the electromotor into relatively large torque provided at relatively little rpm at an output of the rotary actuator. In particular, the rotary actuator comprises a self-locking transmission. The rotary actuator preferably includes a harmonic gearing. The rotary actuator, in particular the transmission, may be configured to limit the angular range of the pivoting movement of the variable lift body with regard to the fuselage around the first axis to a predefined angular pivoting range, in particular between a cruising position and of vertical takeoff/landing position. The angular pivoting range limited by the rotary actuator may be defined to be less than 180°, in particular less than 135°. Alternatively or additionally, the angular pivoting range allowed for by the rotary actuator may be at least 60°, in particular at least 90°, more particularly at least 100°. The angular pivoting range may be in the range of 125°±5°. It may be preferred that the variable lift body may have a primary arrangement, in particular corresponding to a horizontal direction for an aircraft sitting on a horizontally level ground with its undercarriage. In relation to the primary arrangement, the angular pivoting range may be limited to no more than 135° downwards, in particular no more than 115° downwards, more particularly no more than 90° downwards. Alternatively or additionally, in relation to the primary arrangement, the angular pivoting range may be limited to no more than 30° upwards, in particular no more than 10° upwards, more particularly no more than 5° upwards. Alternatively or additionally, in relation to the primary arrangement, the angular pivoting range may be at least 60° downwards, in particular at least 90°, preferably at least 100° downwards. Alternatively or additionally, in relation to the primary arrangement, the angular pivoting range may be at least 0° upwards, in particular at least 5° upwards, preferably at least 10° upwards. Alternatively, for an embodiment such as a front canard structure realizing a variable lift body, the angular pivoting range shall be in the range of at least 270°, preferably 360° or more. It is preferred that the aerofoil surrounds the rotary actuator completely, particularly in the longitudinal and/or vertical direction of the aircraft, in particular such that the drag of the variable lift body remains unaffected by the geometry of the rotary actuator. The aerofoil of the variable lift body may realize a housing encasing the rotary actuator, in particular regardless of the pivoting position of the variable lift body with regard to the fuselage.

According to one embodiment of an aircraft, the variable lift body is fastened to the fuselage with at least one joint assembly adapted for transferring torque around the first axis from the variable lift body to the fuselage. The rotary actuator is arranged adjacent to the joint assembly in the direction of the first axis. In the direction of the first axis, it may be preferred that the rotary actuator is arranged in closer proximity to the fuselage than the joint assembly, or vice versa. A transmission of the rotary actuator is preferably arranged between an electromotor and the joint assembly in the direction of the first axis. In particular, the rotary actuator may be arranged at the forward and of the variable lift body. By arranging the rotary actuator in close proximity with the joint assembly, a favorable weight distribution and small space consumption can be achieved, which allows to improve aerodynamics and thereby efficiency.

In another embodiment, which may be combined with the aforementioned one, the rotary actuator has an axis of rotation parallel to the first axis. In particular, the axis of rotation of the rotary actuator may be coaxial with the pivoting axis. The first axis may correspond to the pitch axis of the aircraft.

According to a second aspect of the invention, which may be combined with the first aspect of the invention, an aircraft comprises a fuselage and a variable lift body movably attached to the fuselage. The variable lift body is pivotable around the first axis extending in the wing span direction. Preferably, the wing span direction of the variable lift body defines the first axis. The first axis may correspond to the pitch axis of the aircraft and/or to the lateral axis of the aircraft. The variable lift body may for example be a control canard. The aircraft may be provided with the primary lift body fastened to the fuselage, such that the variable lift body is pivotable also with regard to the primary lift body around the first axis. The first axis may be defined by a wing span direction of the primary lift body. The primary lift body may be designed larger than the variable lift body and as a statically load-bearing element. The variable lift body may for instance be realized in the form of the landing flap or an aileron. The variable lift body is fastened to the fuselage with at least one joint assembly adapted for transferring torque around the first axis from the variable lift body to the fuselage. The joint assembly may be configured to limit the angular range of the pivoting movement of the variable lift body with regard to the fuselage around the first axis to a predefined angular pivoting range, in particular between a cruising position and of vertical takeoff/landing position. The angular pivoting range limited by the joint assembly may be defined to be less than 180°, in particular less than 135°, more particularly less than 110°. Alternatively or additionally, the angular pivoting range allowed for by the joint assembly may be at least 45° in particular at least 60°, more particularly at least 80°.

According to the second aspect of the invention, the joint assembly is adapted to allow freedom of rotational movement around a second axis crosswise, in particular perpendicular, to the first axis. The second axis is different from the first axis. The second axis may for instance correspond to the longitudinal axis and/or roll axis of the aircraft. Alternatively, the second axis may correspond to the vertical axis and/or yaw axis of the aircraft. It may be preferred, that the joint assembly is adapted to transfer substantially less torque around the second axis between the variable lift body and the fuselage or any intermediate component than around the first axis. In particular, the joint assembly is adapted to transfer less than 10%, preferably no more than 5% torque around the second axis in relation to the torque transferred around the first axis. The joint assembly is particularly adapted not to transfer any torque around the second axis between the variable lift body and the fuselage or any intermediate component, such as in some cases a primary lift body. For example in cases where the second axis corresponds to the roll axis of the aircraft, an aircraft according to the second aspect of the invention is rendered capable by the joint assembly to liberate the variable lift body which may include an engine from torque or the like due to static load of the aircraft primary lift body, for instance static load due to the weight of the primary lift body held by an undercarriage attached to the fuselage; or static load due to the weight of the lift body during flight when the primary lift body provides the lifting force to the aircraft.

In a further development of the second aspect of the invention, the joint assembly is adapted to allow freedom of rotational movement around a third axis crosswise, in particular perpendicular, to the first axis and the second axis. The third axis is different from both the first and second axis. The third axis may correspond to the vertical axis and/or yaw axis of the aircraft. Alternatively, the third axis may for instance correspond to the longitudinal axis and/or roll axis of the aircraft. It may be preferred, that the joint assembly is adapted to transfer substantially less torque around the third axis between the variable lift body and the fuselage or any intermediate component than around the first axis. In particular, the joint assembly is adapted to transfer less than 10%, preferably no more than 5%, torque around the third axis in relation to the torque transferred around the first axis. The joint assembly is particularly adapted not to transfer any torque around the third axis between the variable lift body and the fuselage or any intermediate component, such as in some cases a primary lift body. For example, in cases where the third axis corresponds to the yaw axis of the aircraft, an aircraft according to the further development of the second aspect of the invention is rendered capable by the joint assembly to liberate the variable lift body which may include an engine from torque or the like due to load of the aircraft primary lift body due to drag-forces while cruising at a high forward velocity.

According to a further development of the second aspect of the invention that may be combined with the aforementioned one, the joint assembly includes at least one spherical joint, in particular exactly one spherical joint, attaching the variable lift body to the fuselage. A spherical joint includes a concave reception and a spherical member arranged within the concave reception and rotatable relative to the spherical member around at least two, preferably around three different axes of rotation. The spherical member may be provided with one or two, preferably diametrically opposite, radial extensions, such as a pin, to attach the spherical member to another mechanical component, such as the fuselage, the variable lift body or the linkage. In the embodiment, for each respective one of the first, second and third spherical joint, one of the concave reception and the spherical body is firmly coupled with either one of the variable lift body, the linkage, or the fuselage. Preferably, the first spherical joint is attached to the variable lift body and the primary lift body below the second and third spherical joint. It may be preferred that the first and second spherical joint are rigidly attached to an output shaft of the rotary actuator and that a support section of the rotary actuator is rigidly attached to the variable lift body, or vice versa, wherein the output shaft of the support section of the rotary actuator are rotatable relative to one another, preferably around the first axis.

In a further development of the second aspect of the invention, the joint assembly includes at least one linkage attaching the variable lift body to the fuselage. A second spherical joint connects the variable lift body to the linkage, and a third spherical joint connects the fuselage to the linkage. The joint assembly may include exactly two linkages, each having a respective second and third spherical joint. The linkage may be realized as a monobloc and/or rigid rod or beam. In particular, the joint assembly includes a first spherical joint attaching variable lift body to the fuselage, a second spherical joint attaching the variable lift body to a linkage, and a third spherical joint attaching the fuselage to the linkage.

According to one further development of the second aspect, that may be combined with the previous ones, the joint assembly includes several spherical joints, such as two second spherical joints and two third spherical joints, or one first, one second and one third spherical joint, arranged in a single plane. The single plane in which the several spherical joints are arranged may extend crosswise, in particular perpendicular, to the first axis, particularly in a resting state of the joint assembly. In a particular joint assembly, the distance between the first and second spherical member, the distance between the first and third spherical and the distance between the second and third spherical member may be constant. Preferably, the distance between the second and third spherical joint corresponding to the length of the linkage is no larger than, preferably smaller than, the distance between the first spherical joint and either one of the second or third spherical joint, which may be the same. The first, second and/or third spherical joint may be configured to receive and transmit forces in at least one of the first, second and third, direction. The first spherical member may be rotatably held in a reception of either the fuselage or the variable lift body, whereas a pin extending radially from the first spherical member is rigidly attached to the other one of the variable lift body or fuselage. The second spherical member may be rotatably held in a reception of either the variable lift body or linkage, whereas a pin extending radially from the second spherical member is rigidly attached to the other one of linkage or variable lift body. The third spherical member may be rotatably held in a reception of either the fuselage or linkage, whereas a pin extending radially from the third spherical member is rigidly attached to the other one of linkage or fuselage. It shall be clear that when referring to a connection to the fuselage herein, the connection can refer to indirect connection to the fuselage, for instance directly to a primary lift body which is rigidly attached to the fuselage. This embodiment has been shown to allow for the transmission of large torque around the first axis while relieving the variable lift body from receiving torque from the fuselage around the second or third axis. Furthermore, this embodiment has shown to require only little space and allow for a lightweight solution.

Alternatively, in one embodiment of an aircraft, the joint assembly includes a double cardan joint connecting the variable lift body to the fuselage. In another alternative embodiment of an aircraft, the joint assembly includes a crown spine connecting the variable lift body to the fuselage. In yet another alternative embodiment, the joint assembly includes a jaw coupling connecting the variable lift body to the fuselage. The double Cardan connection, crown spine connection, or jaw coupling may comprise a torque input shaft rigidly connected to the variable lift body, particularly an output shaft of the rotary actuator, wherein the input shaft extends in the direction of the first axis, particularly in a resting state of the joint assembly. Alternatively or additionally, the double Cardan connection, the crown spine connection, or jaw coupling may comprise a torque output shaft rigidly connected to the fuselage, wherein the output shaft extends in the direction of the first axis, particularly in a resting state of the joint assembly.

According to a further alternative of the invention, the joint assembly includes at least one solid body spring connecting the variable lift body to the fuselage. The solid body spring may be designed in a manner known to the skilled person such that torque is only transferred around one first axis whereas the second or third axis crosswise, in particular perpendicular, to the first axis substantially do not transfer torque.

According to one embodiment, the variable lift body is fastened to the fuselage directly or indirectly, for instance via the primary lift body, using exactly two, exactly three or more joint assemblies distanced apart from one another in the direction of the first axis. The first and second joint assembly attaching the variable lift body to the fuselage may be identical or different from another. By attaching the variable lift body exclusively with joint assemblies transferring torque around the first axis while not necessarily around any other axis, the variable lift body can be held to the fuselage in such a manner that only torque necessary for lifting, steering and/or propulsion of the aircraft is transferred.

Alternatively, the variable lift body is fastened to the fuselage, directly or indirectly, for instance via the primary lift body, using exactly one joint assembly and at least one bearing distanced apart from the joint assembly in the direction of the first axis. The bearing may be configured to receive and transmit forces between the fuselage and the variable lift body in at least one of the first, second and third, direction, in particular in at least two of the first, second and third direction, preferably in all of the first, second and third direction. In particular, the bearing allows rotational freedom of movement around the first, second and/or third axis. The bearing may be configured to transfer a torque from the variable lift body to the fuselage around a first, second and/or third axis. By using on the one hand a bearing and on the other hand a joint assembly to attach the variable lift body to the fuselage, a particularly weight-efficient connection may be realized which sufficiently liberates the variable lift body or from receiving any detrimental torque around any other than the first axis.

In one embodiment of an aircraft, the variable lift body includes an engine adapted to provide thrust for the aircraft for at least one of takeoff, landing, or cruising. The variable lift body may include an engine for providing thrust to the aircraft. The variable lift body in particular includes an engine pivotable in relation to the fuselage between a cruising flight position in which the thrust direction of the engine is aligned with the longitudinal axis of the aircraft, and a takeoff and landing position or hover position in which the thrust direction of the engine is angled towards the vertical axis of the aircraft. In particular, in the cruising flight position, the thrust direction of the engine may be parallel to the heading direction or the roll axis or may be inclined to the heading direction or the roll axis by an angle smaller than 15°. In particular, in the hover position, the thrust direction of the engine may be parallel to the vertical direction or may be inclined to the vertical axis or yaw axis by an angle smaller than 15°. The variable lift body including an engine pivotably attached to the fuselage of an aircraft may be described as a thrust vectoring system. The aircraft can include at least one variable lift body including an engine in the rear of the aircraft, in particular in combination with a primary lift body. Alternatively or additionally, the aircraft can include at least one variable lift body including an engine in the front of the aircraft, in particular in the manner of, instead of, or in combination with a canard. Alternatively or additionally, the aircraft can include at least one variable lift body including an engine attached to the central section of the aircraft with regard to its lengthwise extension, in particular in combination with a primary lift body. The aircraft can include a plurality of engines arranged side-by-side in a row transversely to the direction of flow and/or in the direction of the first axis. It may be preferred that the at least one engine is an electrically driven ducted fan.

In another embodiment of an aircraft, that may be combined with the aforementioned one, the variable lift body includes an aerodynamic control structure, such as a control canard, a canard structure, an aileron or landing flap.

In yet another embodiment of an aircraft, that may be combined with one or more of the aforementioned ones, the aircraft includes at least one primary lift body, such as a canard structure and/or a wing, which is stationarily attached to the fuselage, wherein the variable lift body is attached to the primary lift body. The primary lift body may have a relatively large surface area extending in the wing span direction and the longitudinal direction of the aircraft. The primary lift body may be a statically loadbearing element for providing a lifting force during cruising flight of the aircraft in the primary cruise flight direction. It may be preferred that the primary lift body is integrally connected to the fuselage of the aircraft. In particular, the variable lift body is arranged behind the primary lift body with regard to the cruise flight direction of the aircraft.

In another embodiment, the aircraft further comprises another attachment pivotably connecting the variable lift body to the fuselage around the first axis and allowing freedom of linear movement of the variable lift body in the direction of the first axis. The another attachment may include a sliding bearing and a fourth spherical joint. The fourth spherical joint comprises a spherical member rotatably held within a concave reception. The fourth spherical member may be rotatably held in a reception of either the fuselage or the variable lift body, whereas a slidable connection extending radially from the fourth spherical member is rigidly attached to the other one of the variable lift body or fuselage. It may be preferred that the fourth spherical joint is attached to the variable lift body rotatable relative to the first axis. The fourth spherical joint may be configured to receive and transmit forces in at least one of the first, second and third, direction. The another attachment and the joint assembly are rigidly coupled the variable lift body, wherein the another attachment member and the joint assembly are preferably distanced from one another in the direction of the first axis, in particular by at least one third, preferably by at least half, more preferably by at least two thirds, of the extension of the variable lift body in the direction of the first axis. Alternatively, the distance may be less than half, in particular less than one third, of the extension of the variable lift body.

Referring to the figures, FIG. 1a and FIG. 2a show the aircraft 1 having the variable lift body 5 arranged in different pivoting positions in relation to the fuselage 3. FIG. 1a shows the variable lift body 5 including an aileron 55 and a multitude of electrically powered ducted fan engines 53 arranged in a vertical take-off/landing or hovering position which is shown in further detail in FIG. 1b. FIG. 2a shows the same variable lift body 5 in a tilted intermediate pivoting position which may correspond to a state after take-off and before cruise flight or after cruise flight and before landing, which is shown in further detail in FIG. 2b. The multitude of electrically powered ducted fan engines 53 is arranged immediately adjacent one another in the direction of the first axis Y of the aircraft. FIG. 3 shows once again the same variable lift body 5, however, arranged in alignment with the primary lift body 4 and thus in a cruising position in which the direction of thrust T of the engine 53 is aligned with the forward cruise flight direction F. The forward cruise flight direction F may correspond to the longitudinal axis or roll axis X of the aircraft.

In the illustrated embodiment, the variable lift body 5 is rotatably attached to the fuselage 3 via the main or primary lift body 4. In relation to the fuselage 3 of the primary lift body 4, the variable lift body 5 is pivotable around a first axis Y corresponding to the direction of the wing span. The first axis Y may correspond to the lateral axis or pitch axis of the aircraft 1.

The weight of the variable lift body 5 and/or the thrust provided by the engines 53 transferred from the variable lift body 5 to the fuselage 3 through a joint assembly 7 one embodiment of which will be described in further detail below with regard to FIGS. 4a and 4b. The joint assembly is configured to transfer torque from the variable lift body 5 to the fuselage 3 and vice versa exclusively around the first axis Y.

The joint assembly 7 is adapted not to transfer torque around a second axis that may correspond to the aircraft's 1 roll axis X nor around a third axis that may correspond to the aircraft's 1 yaw axis Z. Thereby, the joint assembly 7 liberates the engine 53 or other components of the variable lift body 5 from torque loads onto the primary lift body 4 for instance due to drag or lifting forces which may cause a deformation of the primary lift body 4 which should not impair the engine 53 and particularly not impair multiple engines 53 being arranged immediately adjacent one another in a row in the direction of the first axis Y.

Figures 4A, 4B:
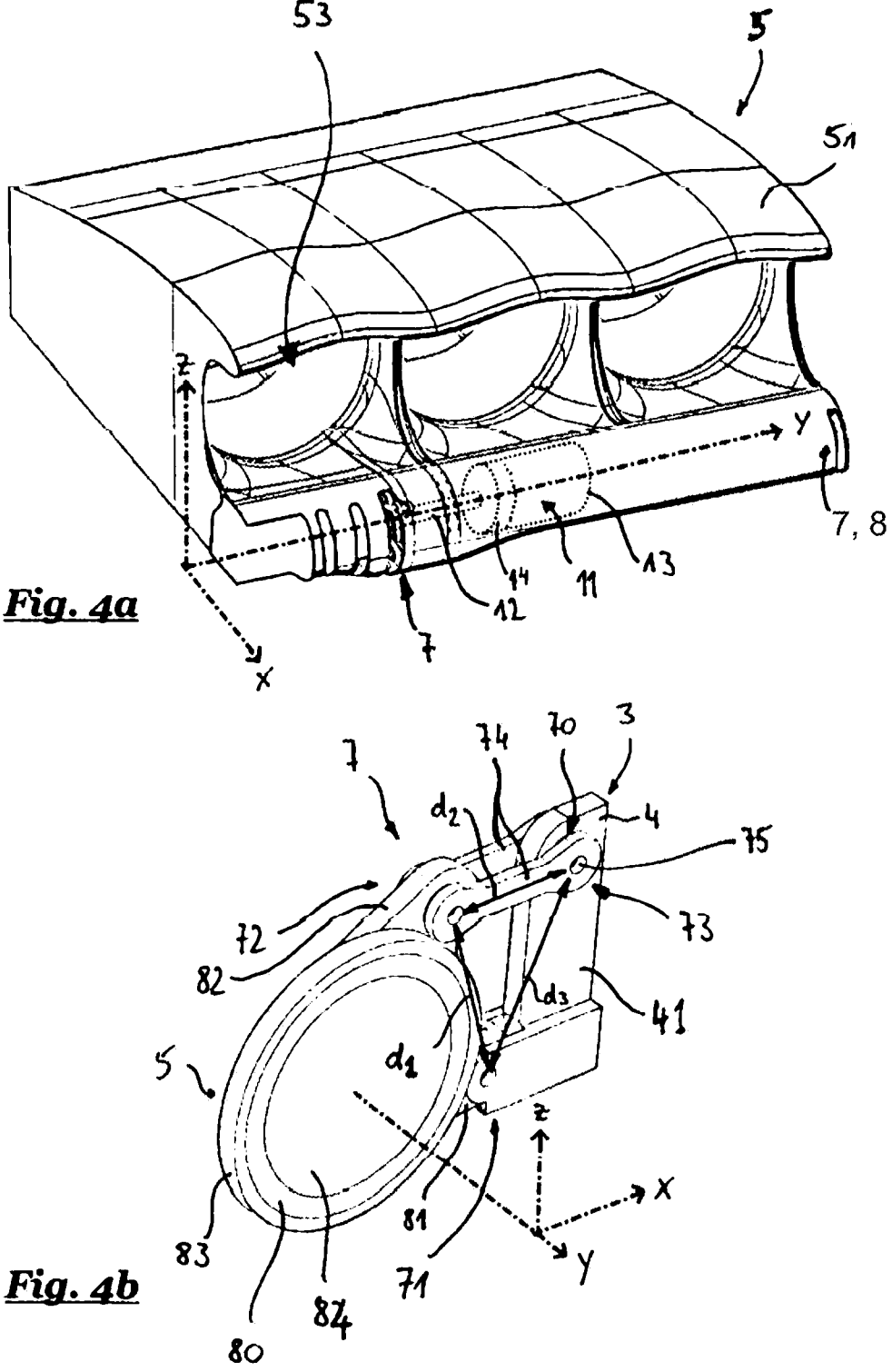
FIG. 4a shows a close-up perspective view of the variable lift body of FIG. 1a, according to certain aspects of the present disclosure.
FIG. 4b shows a schematic view of a first embodiment of a joint assembly used in the variable lift body of FIG. 4a, according to certain aspects of the present disclosure.

FIG. 4a shows a perspective schematic sectional view through an exemplary variable lift body 5 that consists mainly of an engine 53 surrounded by an aerofoil 51 defining the aerodynamic streamlining properties of the variable lift body 5. Inside of the encasing defined by the aerofoil 51, a rotary actuator 11 is arranged which is adapted to set the pivoting position of the variable lift body 5 in relation to the aircraft's 1 fuselage 3. The attachment to the fuselage 3 is realized by means of the joint assembly 7. Another attachment 8 which may include a further joint assembly or another bearing may additionally be provided.

The rotary actuator 11 is rigidly connected to the variable lift body 5 through a support section 13. The rotary actuator 11 has an output shaft 12 rotatable in relation to the support section 13. The output shaft 12 is rigidly attached to the joint assembly 7 to define the pivoting position of the variable lift body 5 in relation to the fuselage 3. The rotary actuator 11 may include an electromotor coupled to a self-locking transmission 14 adapted to provide low angular velocity and high torque to the output shaft 12 from the electromotor. The output shaft 12 and the rotary actuator 11 extend coaxially to the first axis Y. In the direction of the first axis Y, the rotary actuator 11 is arranged adjacent to the joint assembly 7.

FIG. 4b shows an exemplary embodiment of a joint assembly 7 for transferring torque around the first axis Y from the variable lift body 5 to the fuselage 3. In the forward direction of the longitudinal axis X, the joint assembly 7 is attached to a support structure 41 of the primary lift body 4 fastened to the fuselage 3. In the rearward direction with regard to the longitudinal axis X, the joint assembly 7 is attached to the variable lift body 5 through a support ring 83. The support ring 83 houses a crossed roller bearing 80. A torque shaft 84, which is rigidly connected to the output shaft 12 of the rotary actuator 11, is borne by the crossed roller bearing 80.

The torque shaft 84 has two eccentric noses 81, 82 arranged along its outer circumference and protruding radially outwardly from the first axis Y. The first eccentric nose 81 is, in the illustrated resting position of the joint assembly 7, arranged vertically below the second eccentric nose 82 in a first distance d1. The first eccentric nose 81, in the resting position such as shown in FIGS. 4a and 4b, extends approximately horizontally in the direction of the longitudinal axis X of the aircraft 1 from the center of rotation of the torque shaft 84. The first eccentric nose 81 includes a concave reception 70 receiving a spheroid from which a pin extends in the direction of the first axis to be connected to the support structure 41. The first eccentric nose 81 is connected to the support structure 41 through a first spherical joint 71.

The second eccentric nose 82 also includes a concave reception 70 receiving another spheroid from which another pin extends in the direction of the first axis Y to be connected to a linkage 74. Thus, a second spherical joint 72 connects the linkage 74 to the second eccentric nose 82. The linkage 74 is formed by two rigid bars extending in parallel, roughly in the direction of the longitudinal axis X of the aircraft 1. Spaced apart by a second distance d2, the linkage 74 connects on the one hand to the second spherical joint 72 and on the other hand to the third spherical joint 73. The third spherical joint 73 connects the linkage 74 to the support structure 41. The support structure 41 forms a concave reception 70 holding a spheroid from which two pin-like extensions 75 protrude in the direction of the first axis Y. The pin-like extensions 75 of the third spherical joint 73 are connected to the linkage 74. The third spherical joint 73 is distanced by a third distance d3 from the first spherical joint 71. The first distance d1 and third distance d3 are approximately the same. The second distance d2 is shorter than the first and third distance d1, d3.

The first, second, and third spherical joints 71, 72, and 73 allow for rotation of the respective internal spheroid around three mutually perpendicular axes of rotation. However, as the linkage 74 includes three spherical joints 71, 72, 73 arranged in a triangular arrangement defining a single plane, any relative movement of the linkage 74 along a vector in said plane is a constricted and thus torque is transferred. In the resting position shown in FIG. 4b, the plane defined by the triangular arrangement of the spherical joints 71, 72 and 73 is oriented perpendicular to the first axis Y, in other words, the first axis Y is a normal vector of said plane.

Figure 4C:
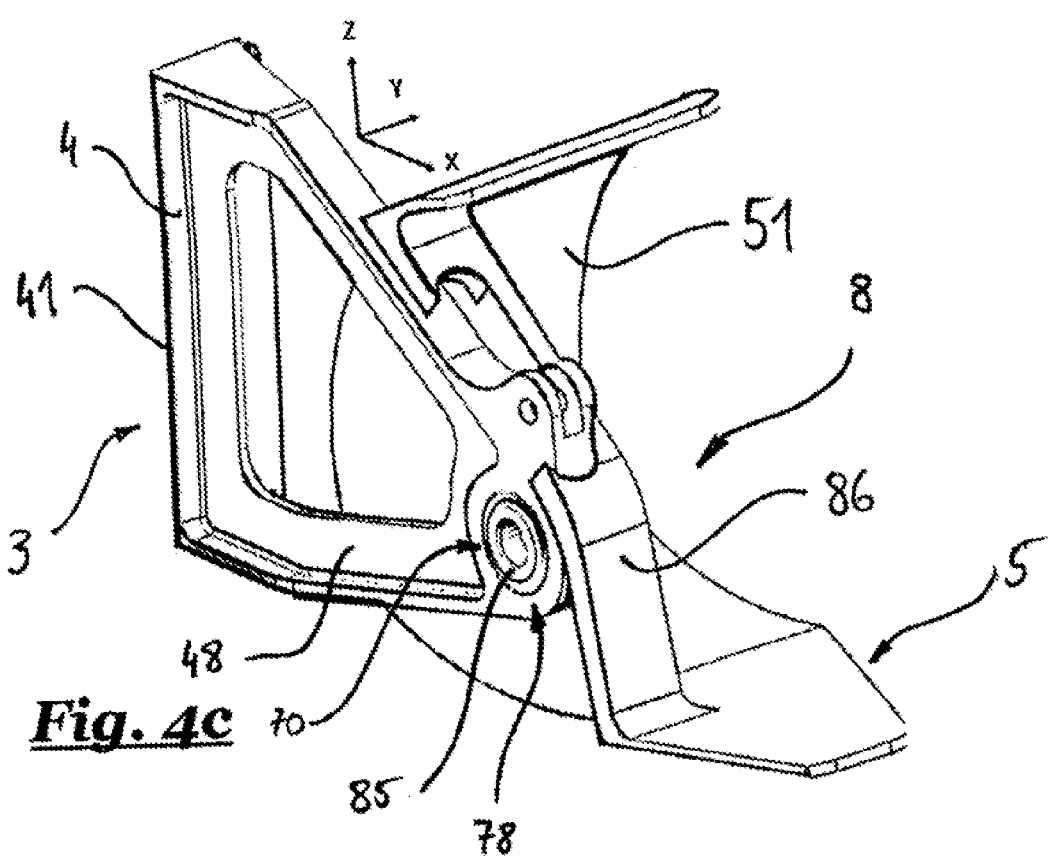
FIG. 4c shows an attachment coupled to the variable lift body of FIG. 4a and used in conjunction with the joint assembly of FIG. 4b, according to certain aspects of the present disclosure.
Figure 5:
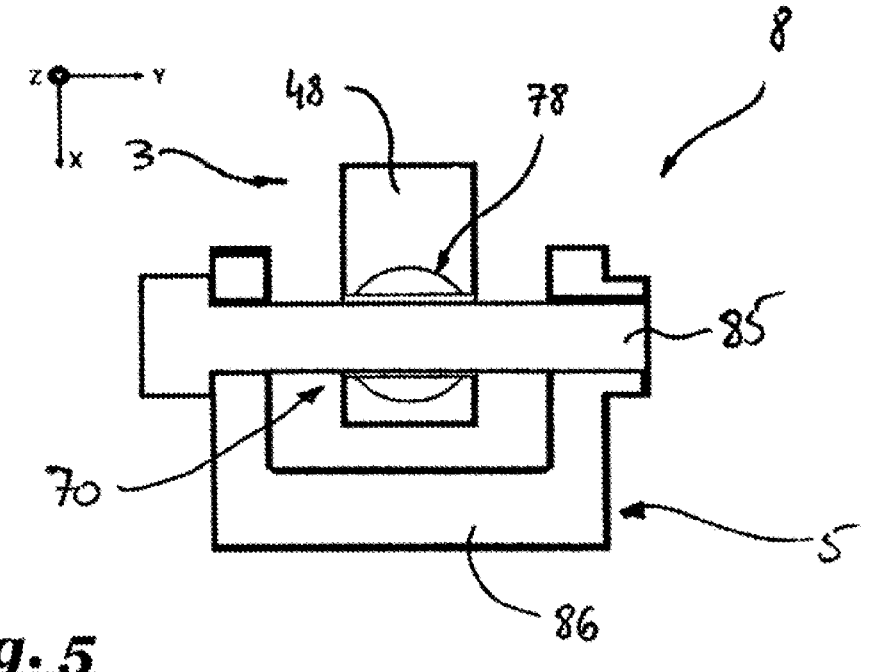
FIG. 5 shows a detailed sectional view of the attachment of FIG. 4c, according to certain aspects of the present disclosure.

Any relative movement of the fuselage 3 in relation to the variable lift body 5 along a vector deviating from said plane is uninhibited by the linkage 74 at least for a certain range. Thus, torque transfer from the variable lift body 5 through the linkage 74 to the fuselage 3, and vice versa, around second or third axes X, Z, is avoided, FIG. 4c shows an exemplary embodiment of the another attachment 8 comprising a single spherical joint 78. FIG. 5 shows a detailed sectional view of the attachment 8 shown in FIG. 4c. The exemplary attachment 8 described herein could be used in conjunction with any joint assembly 7 described herein.

The spherical joint 78 moveably connects the variable lift body 5 to the fuselage 3. The spherical joint 78 of the attachment 8 allows for a rotation of the variable lift body 5 about the first axis Y in relation to the primary lift body 4. Furthermore, the spherical joint 78 is slidable in the direction of the first axis Y along the support lug 85. Thereby, the spherical joint 78 allows for a linear displacement of the variable lift body 5 with regard to the primary lift body 4 in the area of the attachment 8. This allows for displacement in case of a deformation of either the primary lift body 4 or the variable lift body 5 in relation to the lateral axis Y defined by the lateral extension of the variable lift body 5.

The support lug 85 attaches the spherical joint 78 to the flap bracket 86. The flap bracket 86 is rigidly coupled to or formed as a single piece with the variable lift body 5. The support lug 85 extends through a reception 70 in the wing bracket 48, in which the spherical joint 78 is arranged.

Figures 6, 7:
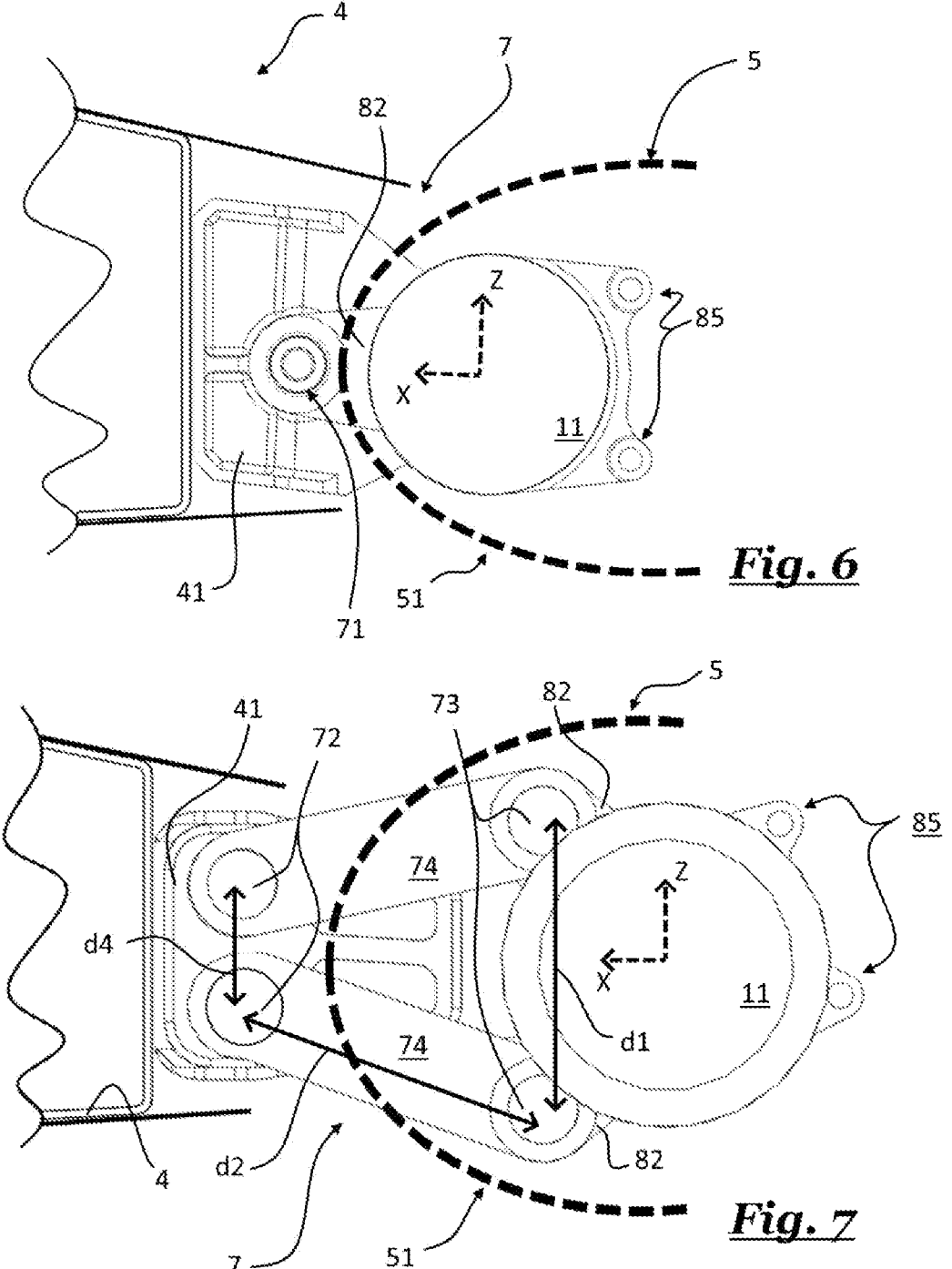
FIG. 6 shows a schematic view of a second embodiment of a joint assembly used in the variable lift body of FIG. 4a, according to certain aspects of the present disclosure.
FIG. 7 shows a schematic view of a third embodiment of a joint assembly used in the variable lift body of FIG. 4a, according to certain aspects of the present disclosure.

FIG. 6 shows an alternative embodiment of a joint assembly 7. The joint assembly is of particularly simple design having only one spherical joint 71. The single spherical joint 71 of the joint assembly exemplarily shown in FIG. 6 directly connects the rotary actuator 11 of the variable lift body 5 to the support structure 41 of the primary lift body 4. The support structure 41 in this case may be realized, for example, as a wing spar or an aft spar. The rotary actuator 11 may be rigidly attached to the variable lift body 5 through several support lugs 85. The spherical joint 71 is held to the rotary actuator 11 with a lever-like second eccentric nose 82 extending radially, essentially in the direction of a second, preferably longitudinal, axis X from the rotary actuator 11, the rotary axis of which corresponds to the first axis Y. The spherical joint 71 allows to introduce torque from the rotary actuator 11 around the first axis Y into the primary lift body 4 while permitting free rotary movement with regard to the second and third (longitudinal and vertical) axes of the variable lift body 5 regard to the primary lift body 4. A joint assembly 7 as shown in FIG. 6 may be combined with two or more additional bearings 80 (not shown) for attachment of the variable lift body.

Yet another alternative embodiment of a joint assembly 7 is shown in FIG. 7 which allows to transfer torque around the first axis Y from the rotary actuator 11 contained within the aerofoil 51 of the variable lift body 5 to the fuselage 3 through a primary lift body 4. The joint assembly 7 comprises two linkages 74 and four spherical joints 72, 73. Each linkage 74 has one respective second spherical joint 72 for attachment to the support structure 41 of the primary lift body 4, and one respective third spherical joint 73 for attachment to the variable lift body 5. A joint assembly 7 as shown in FIG. 7 may be combined with two or more additional bearings 80 (not shown) for attachment of the variable lift body 5.

The linkages 74 of the joint assembly 7 can have the same second length d2, or different second lengths (not shown). The first distance d1 of the spherical joints 73 rigidly attached to the variable lift body 5 is larger than the fourth distance d4 of the spherical joints 72 rigidly attached to the primary lift body 4.

Embodiments of the aircrafts described herein can be advantageously used for vertical take-off and landing (VTOL). The aircraft includes a fuselage, a wing attached to the fuselage, and a variable lift body that is pivotably attached to the wing. The variable lift body has an engine and is adapted to pivot around a first axis along the wingspan of the aircraft. The engine is adapted to provide thrust to the aircraft during take-off, landing, and cruising by pivoting in relation to the wing. The aircraft may in particular be configured for carrying at least one human passenger, preferably several human passengers, and/or comprising at least one electrically-powered flight propulsion system, preferably a flight propulsion system for electrical vertical takeoff and landing (eVTOL).

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

REFERENCE NUMBERS 1 aircraft
3 fuselage
4 primary lift body
5 variable lift body
7 joint assembly
8 attachment
11 rotary actuator
12 output shaft
13 support section
14 transmission
41 support structure
48 wing bracket
51 aerofoil
53 engine
55 aileron
70 reception
71, 72, 73, 78 spherical joint
74 linkage
75 pin-like extension
80 roller bearing
81, 82 eccentric nose
83 support ring
84 torque shaft
85 support lug
86 flap bracket
d1 first distance
d2 second distance
d3 third distance
d4 fourth distance
F cruise flight direction
T thrust direction
X roll axis; longitudinal axis
Y first axis; pitch axis; lateral axis
Z yaw axis; vertical axis
What is claimed is:

1. An aircraft capable of vertical take-off and landing, comprising:
  a fuselage;
  a variable lift body being moveably attached to the fuselage, wherein the variable lift body is pivotable around a first axis extending in a direction of a wingspan of the aircraft, wherein the variable lift body defines an aerofoil;
  a rotary actuator adapted to cause the variable lift body to pivot in relation to the fuselage, wherein the rotary actuator is arranged within said aerofoil; and
  at least one joint assembly for fastening the variable lift body to the fuselage, the at least one joint assembly adapted for transferring torque around the first axis from the variable lift body to the fuselage, wherein the at least one joint assembly is adapted to allow freedom of rotational movement around a second axis crosswise to the first axis.

2. The aircraft of claim 1, wherein the at least one joint assembly is adapted to allow freedom of rotational movement around a third axis crosswise to both the first axis and the second axis.

3. The aircraft of claim 1, wherein the at least one joint assembly further includes at least one spherical joint for attaching the variable lift body to the fuselage.

4. The aircraft of claim 3, wherein the at least one joint assembly further includes:
  at least one linkage attaching the variable lift body to the fuselage,
  a second spherical joint connecting the variable lift body to the at least one linkage, and
  a third spherical joint connecting the fuselage to the at least one linkage.

5. The aircraft of claim 3, wherein the at least one joint assembly includes a plurality of spherical joints arranged in a plane to the first axis.

6. The aircraft of claim 1, wherein the variable lift body is fastened to the fuselage using two or more joint assemblies distanced apart in the direction of the first axis.

7. The aircraft of claim 1, wherein the variable lift body is fastened to the fuselage using exactly one joint assembly and at least one bearing distanced apart from the joint assembly in the direction of the first axis, and wherein the at least one bearing allows rotational freedom of movement around the first axis, the second axis, and/or a third axis.

8. The aircraft of claim 1, wherein the variable lift body includes an engine adapted to provide thrust to the aircraft for at least one of take-off, landing, or cruising, the engine is pivotable in relation to the fuselage between a cruising flight position in which the thrust direction of the engine is aligned with a longitudinal axis of the aircraft, and a take-off/landing position in which the thrust direction of the engine is angled towards a vertical axis of the aircraft.

9. The aircraft of claim 1, wherein the variable lift body further include an aerodynamic control structure.

10. The aircraft of claim 1, further comprising:
  at least one primary lift body stationarily attached to the fuselage, wherein the variable lift body is attached to the at least one primary lift body, and wherein the variable lift body is arranged behind the at least one primary lift body with regard to a direction of cruise flight.

11. The aircraft of claim 1, further comprising an attachment rotatably connecting the variable lift body to the fuselage around the first axis, the attachment allowing freedom of linear movement of the variable lift body in the direction of the first axis.

12. The aircraft of claim 1, wherein the variable lift body is fastened to the fuselage with the at least one joint assembly, and wherein the rotary actuator is arranged adjacent to the at least one joint assembly in the direction of the first axis.

13. The aircraft of claim 1, wherein the rotary actuator has an axis of rotation parallel to the first axis.

* * * * *